April 19, 1927.
C. RESTEIN
FIBER PACKING
Filed Nov. 4, 1922
1,625,095
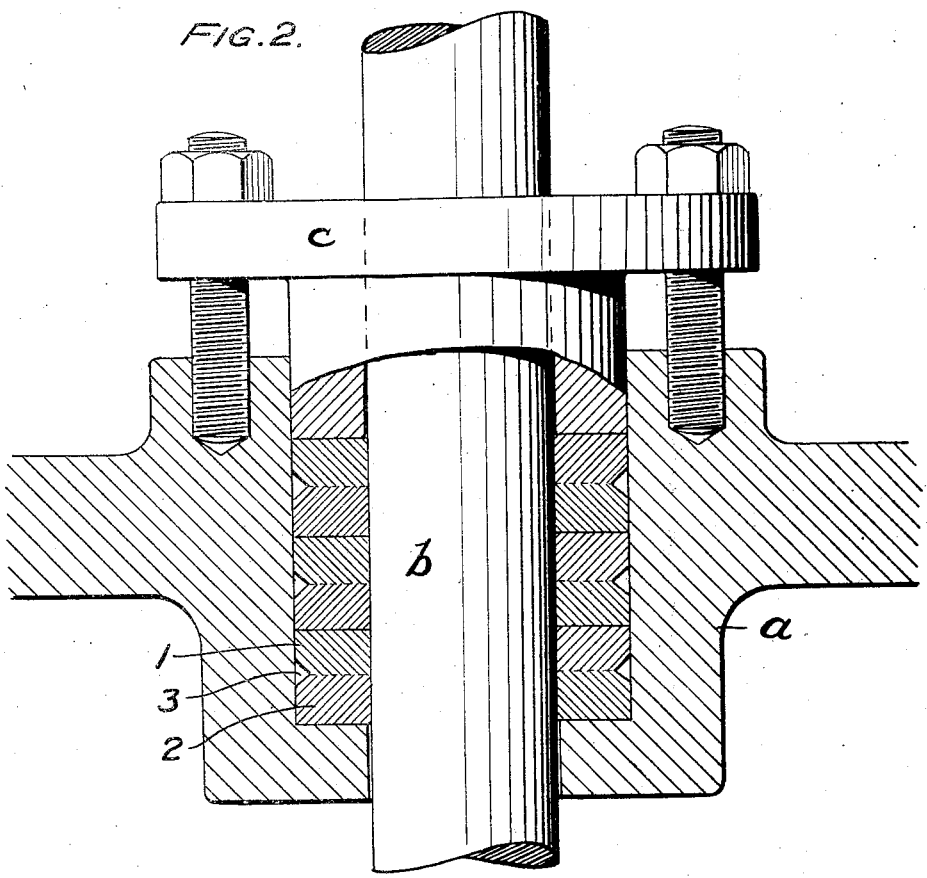
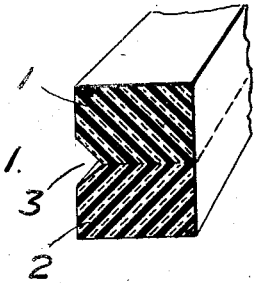
INVENTOR
Clement Restein
BY
Augustus B. Stoughton
ATTORNEY.
WITNESS:

Patented Apr. 19, 1927.

1,625,095

UNITED STATES PATENT OFFICE.

CLEMENT RESTEIN, OF HATBORO, PENNSYLVANIA.

FIBER PACKING.

Application filed November 4, 1922. Serial No. 599,164.

This invention relates to duck and rubber packing, generally rectangular in cross-section and therefore commonly called rectangular fiber packing, such as is supplied in any convenient lengths from which pieces are cut and arranged as rings in a gland or stuffing box.

The principal objects of the present invention are to reduce the friction heretofore caused by the swelling of the packing; to provide for taking up wear and insuring a tight joint; and to provide a packing of long life which will satisfactorily perform its intended functions without giving rise to undue friction or leakage. To these and other ends hereinafter set forth the invention may be said to comprise a generally rectangular duck and rubber packing in which the layers of duck are arranged at an angle with the converging ends of the layers at one edge of the packing and which is provided at the other edge with a groove to afford space for crowding due to swelling or to gland pressure and to insure presentation of the layers endwise to the moving parts whereby the efficiency of the packing is enhanced and its life prolonged. The invention also comprises the improvements to be presently described and finally claimed.

In the following description reference will be made to the accompanying drawings forming part hereof and in which—

Figure 1 is a perspective view, partly in section of a fiber packing embodying features of the invention, and Fig. 2 is a view, principally in section, illustrating the application of the packing.

In the following description reference will be made to duck and to rubber but those terms are not used in a restricted sense and include material equivalent to duck and to rubber. The packing is generally rectangular in cross-section and will be referred to as rectangular, and in it there are two series 1 and 2 of parallel layers of duck and rubber and the parallel layers of duck in the respective series are disposed in angular relation to present the converging ends of the layers at one edge of the packing, the righthand edge in Fig. 1 of the drawing. The other edge of the packing is provided with a groove 3 common to each series of layers. In use the groove 3 provides space for crowding of the packing which is somewhat deformed under pressure due to swelling or due to gland confinement. The packing swells when wet and since it is confined in the gland or box $a$ the space at 3 permits it to deform in cross-section or flow thus avoiding the exertion of extreme pressure on the rod $b$ which would result in undue friction, and under pressure exerted by screwing down the cap $c$ in order to take up wear and maintain a tight joint the space 3 permits of crowding and of somewhat similar deformation in cross-section with the result that the angle between the layers in the series 1 and 2 becomes more acute and the layers more horizontal than in the drawing so that their ends are presented to the rod $b$ which is advantageous in prolonging the life of the packing. The series 1 and 2 are indicated as separated by a dotted line in the drawing, but that line may be regarded as merely an aid to the description or as indicating a permanent union between the two series in cases where they are made separately and vulcanized or otherwise joined together. Fig. 1 illustrates a short piece of the article as made and sold.

It will be obvious to those skilled in the art to which the invention relates that modifications may be made in details of construction and arrangement without departing from the spirit of the invention which is not limited to those matters or otherwise than as the prior art and the appended claims may require.

I claim:

1. A generally rectangular duck and rubber packing having two series of parallel layers of duck and in which the layers of duck of the respective series are arranged at an angle with the converging ends of the layers at one flat bearing surface of the packing and which is provided at the other bearing surface with an open groove narrower than the last mentioned bearing surface to provide space for crowding.

2. A generally rectangular duck and rubber packing having two series of parallel layers of duck and the parallel layers in the respective series being disposed in angular relation to present some of the converging ends of the layers at one flat bearing surface of the packing and the other flat bearing surface of the packing being provided with an open groove common to each series of layers and narrower than the last mentioned face and adapted to afford space for crowding.

CLEMENT RESTEIN.